US012601260B1

(12) United States Patent
Norris

(10) Patent No.: US 12,601,260 B1
(45) Date of Patent: Apr. 14, 2026

(54) COMPRESSED AIR DRIVEN SYSTEM

(71) Applicant: Jacob Norris, Crossville, TN (US)

(72) Inventor: Jacob Norris, Crossville, TN (US)

( * ) Notice: Subject to any disclaimer, the term of this patent is extended or adjusted under 35 U.S.C. 154(b) by 0 days.

(21) Appl. No.: 18/964,784

(22) Filed: Dec. 2, 2024

Related U.S. Application Data

(60) Provisional application No. 63/608,993, filed on Dec. 12, 2023.

(51) Int. Cl.
| *F01B 17/02* | (2006.01) |
| *B60K 8/00* | (2006.01) |
| *B60K 3/02* | (2006.01) |

(52) U.S. Cl.
CPC .............. *F01B 17/02* (2013.01); *B60K 8/00* (2013.01); *B60K 3/02* (2013.01)

(58) Field of Classification Search
CPC ... B60K 8/00; B60K 3/00; B60K 3/02; B60K 3/04
See application file for complete search history.

(56) References Cited

U.S. PATENT DOCUMENTS

| 4,043,126 A | * | 8/1977 | Santos | ..................... B60K 3/04 |
| | | | | 60/407 |
| 4,355,508 A | * | 10/1982 | Blenke | ..................... F01B 17/02 |
| | | | | 60/415 |

| 6,311,797 B1 | * | 11/2001 | Hubbard | .................. B60K 3/00 |
| | | | | 180/2.2 |
| 6,629,573 B1 | * | 10/2003 | Perry | ...................... F01B 17/02 |
| | | | | 60/407 |
| 8,511,409 B2 | | 8/2013 | Mensah | |
| 8,561,747 B2 | * | 10/2013 | Domes | ..................... F02C 6/16 |
| | | | | 180/2.1 |
| 8,850,807 B2 | | 10/2014 | Huff et al. | |
| 9,475,394 B2 | | 10/2016 | Huff | |
| 9,855,835 B1 | * | 1/2018 | Sneddon | .................. B60K 6/12 |
| 10,363,946 B2 | * | 7/2019 | Sneddon | ................. B61C 11/06 |
| 11,524,562 B1 | | 12/2022 | Elebshihy | |
| 2010/0307849 A1 | * | 12/2010 | Li | ........................ B60K 7/0023 |
| | | | | 180/165 |
| 2019/0351749 A1 | * | 11/2019 | Domes | ..................... B60K 3/04 |

\* cited by examiner

*Primary Examiner* — Thomas E Lazo
(74) *Attorney, Agent, or Firm* — Luedeka Neely, P.C.

(57) ABSTRACT

A compressed air driven system including a compressed air storage vessel; a pneumatic motor configured to receive compressed air from the compressed air storage vessel, wherein the pneumatic motor is coupled to a transmission configured to rotate a primary drive shaft, a first auxiliary shaft, and a second auxiliary shaft; a first air compressor coupled to the first auxiliary shaft, wherein the first air compressor is configured to refill the compressed air storage vessel; a second air compressor coupled to the second auxiliary shaft, wherein the second air compressor is configured to refill the compressed air storage vessel; at least one generator attached to the first air compressor; and a throttle configured to provide compressed air at a predetermined volume and predetermined pressure to the pneumatic motor from the compressed air storage vessel.

15 Claims, 2 Drawing Sheets

COMPRESSED AIR DRIVEN SYSTEM

RELATED APPLICATION

This application claims priority to provisional application No. 63/608,993, filed Dec. 12, 2023.

FIELD OF THE INVENTION

The disclosure is directed to a compressed air driven system and in particular to a pneumatic motor system for vehicles that does not contain a fossil fuel engine.

BACKGROUND AND SUMMARY

There continues to be a need for vehicles that can operate without directly burning fossil fuels. Numerous systems have been devised that use compressed air to operate an engine. However, the energy needed to generate sufficient compressed air, and the means for using the compressed air do not significantly reduce the use of fossil fuels for energy generation. Accordingly, what is needed is a self-contained system that will operate with a minimum of energy input from fossil fuels.

In view of the foregoing, an embodiment of the disclosure provides a compressed air driven system including a compressed air storage vessel. A pneumatic motor is provided and is configured to receive compressed air from the compressed air storage vessel, wherein the pneumatic motor is coupled to a transmission configured to rotate a primary drive shaft, a first auxiliary shaft, and a second auxiliary shaft. A first air compressor is coupled to the first auxiliary shaft, wherein the first air compressor is configured to refill the compressed air storage vessel. A second air compressor is coupled to the second auxiliary shaft, wherein the second air compressor is configured to refill the compressed air storage vessel. At least one generator is attached to the first air compressor. A throttle is provided and configured to provide compressed air at a predetermined volume and predetermined pressure to the pneumatic motor from the compressed air storage vessel.

In another embodiment there is provided a method for operating a pneumatic motor driven vehicle. The method includes providing a compressed air storage vessel. A pneumatic motor is provided and configured to receive compressed air from the compressed air storage vessel, wherein the pneumatic motor is coupled to a transmission configured to rotate a primary drive shaft, a first auxiliary shaft, and a second auxiliary shaft. A first air compressor is coupled to the first auxiliary shaft, wherein the first air compressor is configured to refill the compressed air storage vessel. A second air compressor is coupled to the second auxiliary shaft, wherein the second air compressor is configured to refill the compressed air storage vessel. At least one generator is attached to the first air compressor. A throttle is provided and configured to provide compressed air at a predetermined volume and predetermined pressure to the pneumatic motor from the compressed air storage vessel. The compressed air storage vessel is initially pressurized with an auxiliary air compressor. The throttle is then adjusted to provide compressed air at the predetermined volume and predetermined pressure to the pneumatic motor, wherein the pneumatic motor rotates the first auxiliary shaft and first air compressor, the second auxiliary shaft and second air compressor; and the primary drive shaft.

In some embodiments, the first auxiliary shaft and the second auxiliary shaft are each coupled to the transmission through a power take-off drive.

In some embodiments, a second generator attached to the second air compressor.

In other embodiments, an air-conditioning compressor attached to the second air compressor.

In some embodiments, a pressure regulator is provided and configured to maintain the predetermined air pressure in the compressed air storage vessel.

In some embodiments, each of the first air compressor and second air compressor is a screw-type air compressor and each screw-type air compressor is configured to provide the predetermined volume of air at the predetermined air pressure to the compressed air storage vessel.

In some embodiments, an air dryer is provided for each of the first air compressor and second air compressor.

In some embodiments, the at least one generator is selected from the group consisting of an AC power generator, and a DC power generator.

In some embodiments, the transmission is selected from an automobile transmission, a heavy duty truck transmission, and an 18 wheeler transmission.

In some embodiments, the first air compressor and the second air compressor each provide compressed air to the compressed air storage vessel at a rate sufficient to maintain the predetermined pressure and predetermined volume required by the pneumatic motor.

In some embodiments, compressed air from each of the first air compressor and from the second air compressor passes through a radiator to remove heat therefrom for heating the pneumatic motor driven vehicle.

In some embodiments, a combined compressed air output of the first air compressor and the second air compressor is about 160 to about 200 percent of an amount of compressed air required to operate the pneumatic motor at the predetermined pressure.

An advantage of the disclosed embodiments is that the system provides a pneumatic driven system that can be used with vehicles and is devoid of liquid and gaseous fuels burning engines. Once the compressed air storage vessel is initially charged with a predetermined amount of air at a predetermined pressure, the first and second air compressors are each configured to recharge the storage vessel at a rate required to maintain the volume and pressure of air needed to operate the pneumatic motor.

DETAILED DESCRIPTION OF EMBODIMENTS OF THE DISCLOSURE

Figure 1:
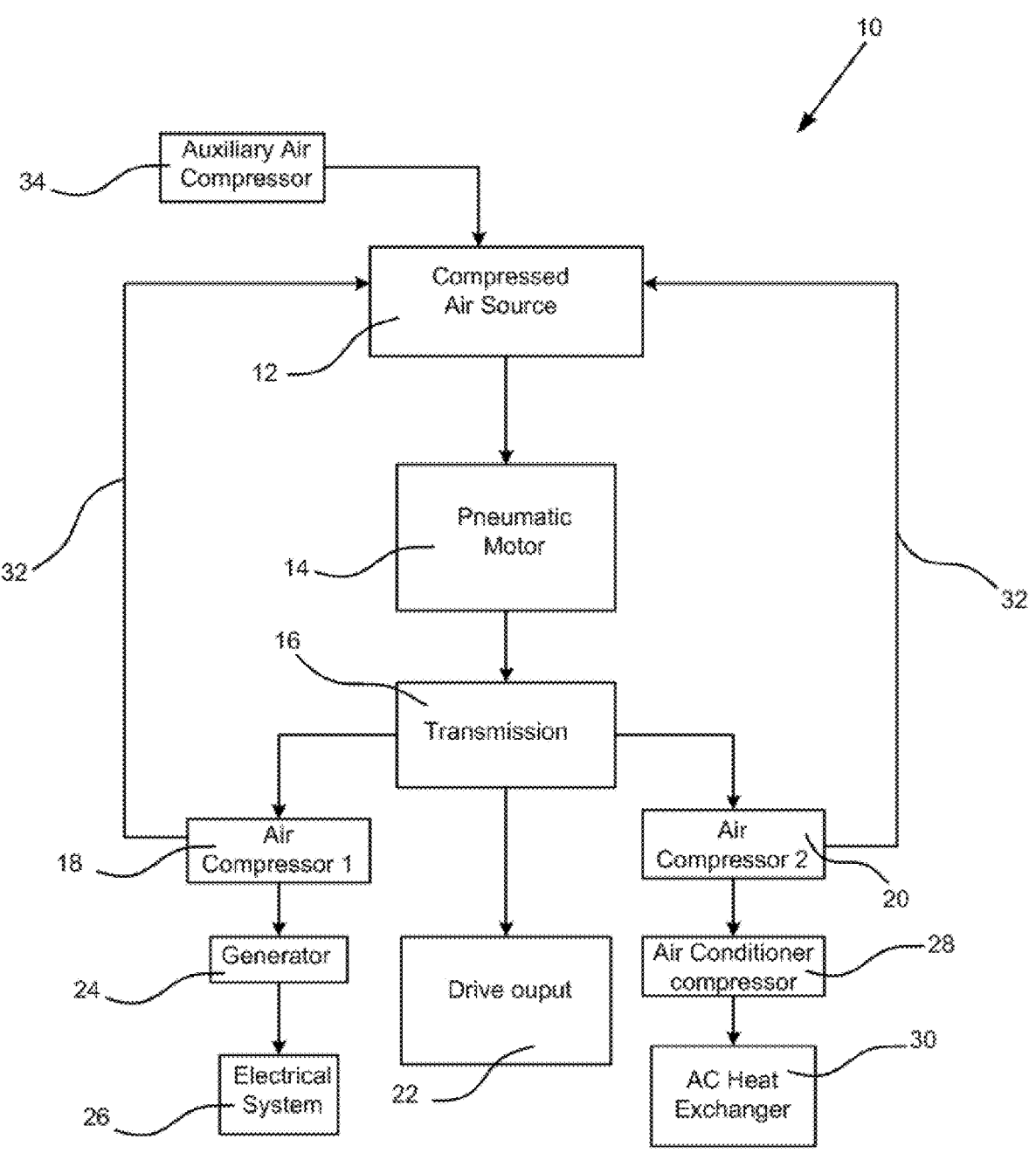
FIG. 1 is a simplified schematic illustration of major components of an embodiment of the disclosure.
Figure 2:
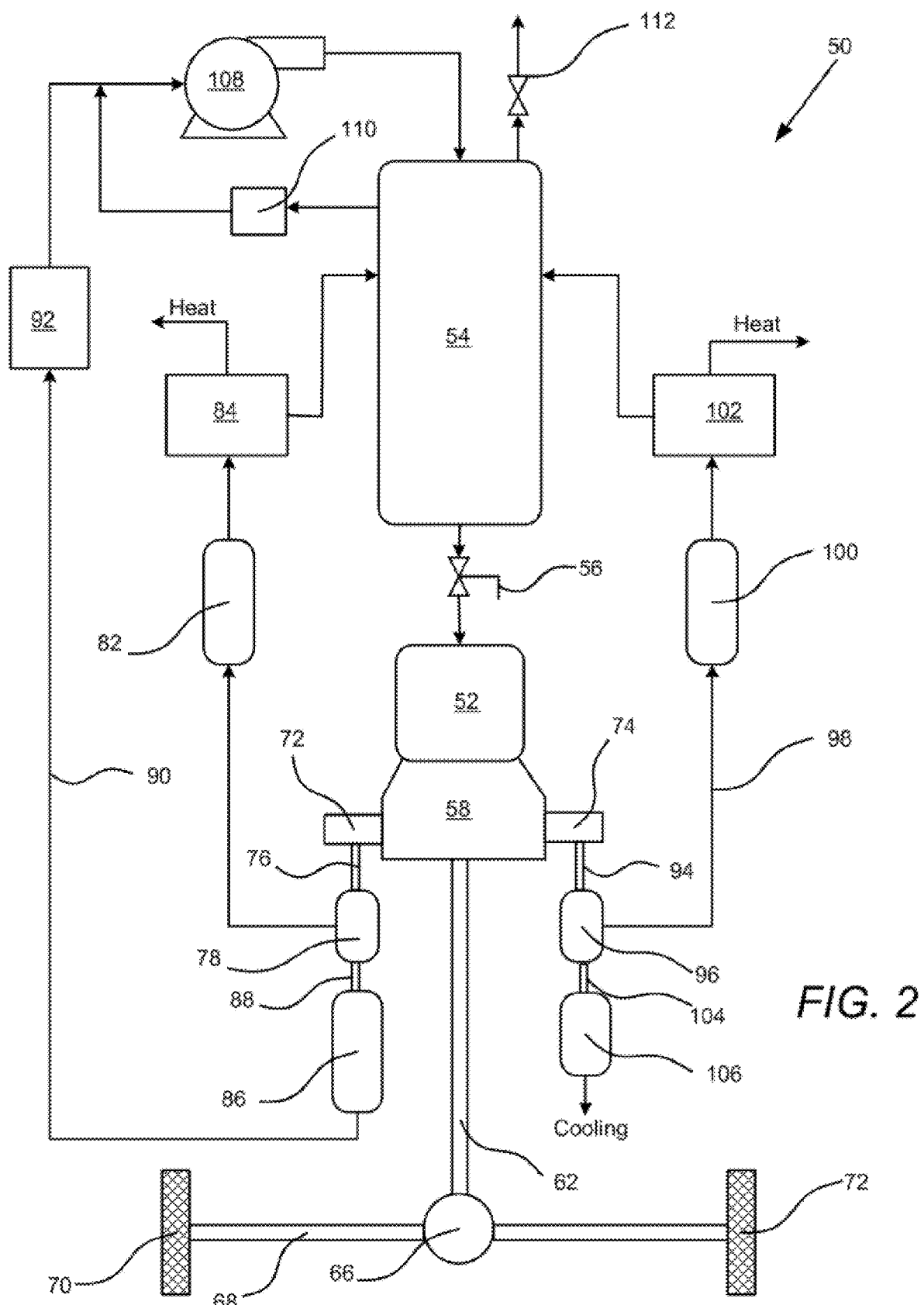
FIG. 2 is a more detailed schematic illustration of a pneumatic driven vehicle according to an embodiment of the disclosure.

Further details of embodiments of the disclosure may be found by referring to FIGS. 1 and 2. Major components of the compressed air driven system 10 are illustrated schematically in FIG. 1 and include a compressed air source 12 that provides compressed air at a predetermined pressure and predetermine volume to a pneumatic motor 14. The pneumatic motor 14 is powered by the compressed air source 12 to drive a transmission device 16 which is coupled by shafts, described below, to a first air compressor 18, a second compressor 20, and a drive output 22. In some embodiments, at least one of the first or second air compressors 18 or 20 is coupled to a generator 24 for providing power to an electrical system 26. At least one of the first or second air compressors 18, 20 is coupled to an air conditioning compressor 28 that provides cooling air flow through an AC heat exchanger 30. A unique feature of the system described herein is that each of the first and second air compressors 18 or 20 has an output 32 that is sufficient to maintain the predetermined volume and predetermined pressure of the compressed air source 12. An auxiliary air compressor 34 is also provided to provide initial start up of the system, and to provide an emergency back up to the first and second air compressors 18 and 20.

A more detailed illustration of the compressed air driven system is illustrated in FIG. 2 as a vehicle 50 that includes a pneumatic motor 52 to operate the vehicle 50. The pneumatic motor 52 may be a sliding vane type or a piston-type pneumatic motor 52 that can generate sufficient torque necessary to operate components of the system. As described above, a compressed air source such as a compressed air tank 54 having a volume ranging from about 40 to about 100 gallons is provided. Compressed air at a predetermined pressure and a predetermined volume is caused to exit from the compressed air tank 54 using a throttling valve 56. The throttling valve 56 may be automatically or manually controlled to provide compressed air to the pneumatic motor 52. The predetermined pressure and predetermined volume are dependent on the size and requirements of the pneumatic motor 52. For example, a pneumatic motor 52 that can provide about 15 to about 22 Kw of power at about 850 to about 1400 rpm and an output torque of about 180 to about 300 pounds-force-foot of torque. The air consumption of the foregoing pneumatic motor is about 700 to about 1000 scfm at about 70 to about 90 psig.

In some embodiments, the pneumatic motor 52 is closely coupled to a bell housing of a multi-speed transmission 58. The transmission 58 may be an automotive transmission, heavy duty truck transmission, or an 18 wheeler transmission having from about 3 to about 15 speeds. In some embodiments, the transmission 58 is configured to rotate a proximal end 60 of a drive shaft 62. A distal end 64 of the drive shaft 62 terminates in a differential 66 that is configured to rotate an axle 68 connected to wheels 70 of the vehicle 50.

The transmission 58 also includes a first power take off drive 72 and a second power take off drive 74 connected to the transmission 58. The first power take off drive 72 has a drive shaft 76 that is attached to a first air compressor 78. The first air compressor 78 may be selected from a screw-type air compressor, a sliding vane-type air compressor, or a piston-type air compressor that is configured to provide compressed air 80 at the predetermined pressure and predetermine volume described above to maintain the predetermined pressure and volume of air in the compressed air tank 54 when the pneumatic motor 52 is operating. The compressed air 80 from the first air compressor 78 may flow through an air dryer/oil tank 82 to remove moisture from the compressed air 80. The compressed air 80 may also be passed through a radiator 84 to remove heat from the compressed air 80 that could be used to heat occupants of the vehicle 50. At least one AC or DC generator or alternator 86 is attached to the first air compressor through a shaft 88 and is configured for providing electrical power 90 to a power distribution and power storage device 92 such as a rechargeable battery.

The second power take off drive 74 also has a drive shaft 94 that is attached to a second air compressor 96. The second air compressor 96 like the first air compressor 78 may be selected from a screw-type air compressor, a sliding vane-type air compressor, or a piston-type air compressor and is also configured to provide compressed air 98 at the predetermined pressure and predetermine volume described above to maintain the predetermined pressure and volume of air in the compressed air tank 54 when the pneumatic motor 52 is operating. The compressed air 98 from the second air compressor 96 may flow through an air dryer/oil tank 100 to remove moisture from the compressed air 98. The compressed air 98 may also be passed through a radiator 102 to remove heat from the compressed air 80 that could be used to heat occupants of the vehicle 50. Like the first air compressor 78, the second air compressor 96 may also be attached through a shaft 104 to an AC or DC generator or alternator. In one embodiment, the second air compressor 96 is attached to an air-conditioning compressor 106 to provide cooling to occupants of the vehicle 50.

During an initial start-up of the vehicle 50, an auxiliary air compressor 108 is provided to initially fill the compressed air tank 54 with the predetermined amount of air at the predetermined pressure. Power to operate the auxiliary air compressor 108 may come from a battery 92 or other power source. A pressure regulator 110 is provided to regulate the pressure of air in the compressed air tank 54 using the auxiliary air compressor 108 if needed. The compressed air tank may also contain a safety relief valve 112 to protect the system from over-pressurization.

In order to demonstrate the claimed system, the following non-limiting example is provided.

A sixty gallon compressed air tank 54 containing an auxiliary air compressor 108 mounted on the compressed air tank 54 is provided. The air compressor 108 is capable of output pressures ranging from about 90 to about 135 psig. Air from the compressed air tank 54 is routed through a manual throttle valve 56 to a pneumatic motor 52 that is capable of producing 21.6 Kw of power at 900 rpm and output of up to about 300 lb-ft of torque with an air consumption of 111 cmf at 90 psig. The pneumatic motor 52 is modified to attach the pneumatic motor 52 to a bell housing of an ALLISON 383 multi-speed transmission 58. Two shaft-driven screw-type air compressors 78 and 96, each rated for 125 psig at 175 cfm (are also attached to the transmission 58 through CHELSEA power take off drives 72 and 74. At least one of the air compressors 78 is attached to a 240 volt generator 86. A main drive shaft 62 is provided from the transmission 58 that can be connected to a differential 66 of a vehicle or other machinery. The system is started up by providing power to the air compressor 108 attached to the compressed air tank 54 to fill and pressurize the tank 54 to about 125 psig. Once the tank 54 is at the desired pressure, the throttle 56 is then opened to allow air from the compressed air tank 54 to activate the pneumatic motor 52 which in turn activates the air compressor 78 and 96 through the transmission 58 and power take off drives 72 and 74. Air compressors 78 and 96 are attached to generators 86 for providing output power to a rechargeable battery 92.

It will be appreciated that the foregoing system example can be modified significantly to provide more or less power output by using a larger or smaller pneumatic motor and transmission. Likewise, the air compressors can be selected to match the requirements of the modified system. While the foregoing contemplates operating a vehicle with a pneumatic motor system as described above, the pneumatic motor system can be modified used for a wide variety of applications to replace electric or fossil fuel power devices. The size of the components of the system will depend on the particular application and will be sized accordingly.

The foregoing description of preferred embodiments have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A compressed air driven system comprising:
a compressed air storage vessel;
a pneumatic motor configured to receive compressed air from the compressed air storage vessel, wherein the pneumatic motor is coupled to a multi-speed transmission configured to rotate a primary drive shaft, the multi-speed transmission having a first power take off drive configured to rotate a first auxiliary shaft and a second power take off drive configured to rotate a second auxiliary shaft;
a first air compressor coupled to the first auxiliary shaft, wherein the first air compressor is configured to refill the compressed air storage vessel;
a second air compressor coupled to the second auxiliary shaft, wherein the second air compressor is configured to refill the compressed air storage vessel;
at least one generator attached to a drive shaft of the first air compressor; and
a throttle configured to provide compressed air at a predetermined volume and predetermined pressure to the pneumatic motor from the compressed air storage vessel.

2. The compressed air driven system of claim 1, further comprising an auxiliary air compressor configured for initially pressurizing the compressed air storage vessel to the predetermined volume at the predetermined pressure.

3. The compressed air driven system of claim 1, further comprising a second generator attached to a drive shaft of the second air compressor.

4. The compressed air driven system of claim 1, further comprising an air-conditioning compressor attached to a drive shaft of the second air compressor.

5. The compressed air driven system of claim 1, further comprising a pressure regulator configured to maintain the predetermined air pressure in the compressed air storage vessel.

6. The compressed air driven system of claim 1, wherein each of the first air compressor and second air compressor is a screw-type air compressor and each screw-type air compressor is configured to provide the predetermined volume of air at the predetermined air pressure to the compressed air storage vessel.

7. The compressed air driven system of claim 1, further comprising an air dryer for each of the first air compressor and second air compressor.

8. The compressed air driven system of claim 1, wherein the at least one generator is selected from the group consisting of an AC power generator, and a DC power generator.

9. The compressed air driven system of claim 1, wherein the transmission is selected from the group consisting of an automobile transmission, a heavy duty truck transmission, and an 18 wheeler transmission.

10. A method for operating a pneumatic motor driven vehicle comprising:
providing a compressed air storage vessel;
a pneumatic motor configured to receive compressed air from the compressed air storage vessel, wherein the pneumatic motor is coupled to a multi-speed transmission configured to rotate a primary drive shaft, the multi-speed transmission having a first power take off drive configured to rotate a first auxiliary shaft and a second power take off drive configured to rotate a second auxiliary shaft;
a first air compressor coupled to the first auxiliary shaft, wherein the first air compressor is configured to refill the compressed air storage vessel;
a second air compressor coupled to the second auxiliary shaft, wherein the second air compressor is configured to refill the compressed air storage vessel;
at least one generator attached to a drive shaft of the first air compressor; and
a throttle configured to provide compressed air at a predetermined volume and predetermined pressure to the pneumatic motor from the compressed air storage vessel;
initially pressurizing the compressed air storage vessel using an auxiliary air compressor;
adjusting the throttle to provide compressed air at the predetermined volume and predetermined pressure to the pneumatic motor, wherein the pneumatic motor rotates the first auxiliary shaft and first air compressor, the second auxiliary shaft and second air compressor; and the primary drive shaft.

11. The method of claim 10 wherein the first air compressor and the second air compressor each provide compressed air to the compressed air storage vessel at a rate sufficient to maintain the predetermined pressure and predetermined volume required by the pneumatic motor.

12. The method of claim 10, wherein each of the first air compressor and second air compressor is a screw-type air compressor.

13. The method of claim 10, wherein a drive shaft of the second air compressor is coupled to an air conditioning compressor, comprising providing cooling to occupants of the pneumatic motor driven vehicle.

14. The method of claim 10, wherein compressed air from each of the first air compressor and from the second air compressor passes through a radiator to remove heat therefrom for heating occupants of the pneumatic motor driven vehicle.

15. The method of claim 10, wherein a combined compressed air output of the first air compressor and the second air compressor is about 160 to about 200 percent of an amount of compressed air required to operate the pneumatic motor at the predetermined pressure.

* * * * *